US010345048B2

(12) United States Patent
Tenore et al.

(10) Patent No.: US 10,345,048 B2
(45) Date of Patent: Jul. 9, 2019

(54) CYCLONIC CONDENSING AND COOLING SYSTEM

(71) Applicant: Golden Renewable Energy, LLC, Yonkers, NY (US)

(72) Inventors: Anthony F. Tenore, Yonkers, NY (US); David Fowler, Yonkers, NY (US); Oluwaseun Oluwadare, Yonkers, NY (US)

(73) Assignee: Golden Renewable Energy, LLC, Yonkers, NY (US)

( * ) Notice: Subject to any disclaimer, the term of this patent is extended or adjusted under 35 U.S.C. 154(b) by 2 days.

(21) Appl. No.: 15/593,579

(22) Filed: May 12, 2017

(65) Prior Publication Data

US 2017/0328643 A1 Nov. 16, 2017

Related U.S. Application Data

(63) Continuation-in-part of application No. 15/054,903, filed on May 12, 2016.

(51) Int. Cl.
*B01D 5/00* (2006.01)
*C10G 9/00* (2006.01)
(Continued)

(52) U.S. Cl.
CPC ............. *F28D 7/1607* (2013.01); *B01D 5/00* (2013.01); *B01D 5/0006* (2013.01);
(Continued)

(58) Field of Classification Search
CPC .... B01J 27/19; B01J 35/0006; B01J 23/8873; B01J 35/1042; B01J 35/1061;
(Continued)

(56) References Cited

U.S. PATENT DOCUMENTS

| 836,701 A | 11/1906 | Oliver |
| 2,458,068 A | 1/1949 | Fuller |

(Continued)

FOREIGN PATENT DOCUMENTS

| CN | 105542830 A | 5/2016 |
| DE | 1769235 A1 | 10/1971 |

(Continued)

OTHER PUBLICATIONS

International Search Report and Written Opinion received in International Application No. PCT/IB2017/052811 dated Aug. 7, 2017.

(Continued)

*Primary Examiner* — Randy Boyer
*Assistant Examiner* — Juan C Valencia
(74) *Attorney, Agent, or Firm* — Ajay A. Jagtiani; Miles & Stockbridge P.C.

(57) ABSTRACT

An apparatus is provided for processing reusable fuel comprising a first-type cyclone cooler having a first configuration. The apparatus also provides one or more second-type cyclone coolers, wherein each one or more second-type cyclone coolers has a substantially identical second configuration to respective other one or more second-type cyclone coolers, wherein the second configuration is different than the first configuration. The apparatus may also provide an air cooled heat exchanger, a coil condenser and one or more bubblers. The first-type cyclone cooler and the one or more second-type cyclone coolers are connected. One of the one or more second-type cyclone coolers is connected to the air cooled heat exchanger. The air cooled heat exchanger is connected to the coil condenser. The coil condenser is connected to the one or more bubblers.

20 Claims, 7 Drawing Sheets

(51) Int. Cl.
*F28D 7/16* (2006.01)
*F28F 1/14* (2006.01)
*F28F 9/02* (2006.01)
*F28F 13/06* (2006.01)
*F28D 1/00* (2006.01)
*F28D 7/02* (2006.01)
*F28D 21/00* (2006.01)

(52) U.S. Cl.
CPC ........... *B01D 5/0081* (2013.01); *C10G 9/002* (2013.01); *F28D 1/00* (2013.01); *F28D 7/024* (2013.01); *F28D 7/026* (2013.01); *F28D 7/1684* (2013.01); *F28F 1/14* (2013.01); *F28F 9/0265* (2013.01); *F28F 13/06* (2013.01); *F28D 2021/0075* (2013.01)

(58) Field of Classification Search
CPC .... B01J 35/108; B01J 35/026; B01J 2523/00; B01J 21/12; C10G 65/04; C10G 45/08
See application file for complete search history.

(56) References Cited

U.S. PATENT DOCUMENTS

| | | |
|---|---|---|
| 2,616,519 A | 11/1952 | Crankshaw et al. |
| 2,916,121 A | 8/1953 | Lips et al. |
| 3,129,459 A | 4/1964 | Kullgren et al. |
| 3,151,784 A | 10/1964 | Tailor |
| 3,168,136 A | 2/1965 | Ammon |
| 3,258,068 A | 6/1966 | Hollister |
| 3,455,789 A | 7/1969 | Landers |
| 3,797,702 A | 3/1974 | Robertson |
| 3,822,866 A | 7/1974 | Daester et al. |
| 3,907,259 A | 9/1975 | Leclercq |
| 3,962,043 A | 6/1976 | Schmalfeld et al. |
| 3,981,454 A | 9/1976 | Williams |
| 4,025,058 A | 5/1977 | Mizuguchi |
| 4,060,127 A | 11/1977 | Savin et al. |
| 4,123,332 A | 10/1978 | Rotter |
| 4,261,225 A | 4/1981 | Zahradnik |
| 4,426,018 A | 1/1984 | Ward |
| 4,437,046 A | 3/1984 | Faillace |
| 4,473,478 A | 9/1984 | Chivrall |
| 4,500,481 A | 2/1985 | Marx, III |
| 4,529,579 A * | 7/1985 | Raahauge ............... C01F 7/441 423/625 |
| 4,640,203 A * | 2/1987 | Wolter ................... B01D 53/34 110/246 |
| 4,858,681 A | 8/1989 | Sulzberger |
| 5,032,143 A * | 7/1991 | Ritakallio ............. B01D 46/38 23/313 FB |
| 5,078,857 A | 1/1992 | Melton |
| 5,129,995 A | 7/1992 | Agarwal |
| 5,174,479 A * | 12/1992 | Dufour ................ B65D 85/182 206/292 |
| 5,205,225 A | 4/1993 | Milsap, III |
| 5,394,937 A | 3/1995 | Nieh |
| 5,611,268 A | 3/1997 | Hamilton |
| 5,720,232 A | 2/1998 | Meador |
| 5,732,829 A | 3/1998 | Smith |
| 5,756,871 A | 5/1998 | Wang |
| 5,762,666 A | 6/1998 | Amrein et al. |
| 5,993,751 A | 11/1999 | Moriarty et al. |
| 6,063,355 A | 5/2000 | Fujimura et al. |
| 6,109,902 A | 8/2000 | Goris et al. |
| 6,126,907 A | 10/2000 | Wada |
| 6,221,329 B1 | 4/2001 | Faulkner et al. |
| 6,298,751 B1 | 10/2001 | Ide et al. |
| 6,387,221 B1 | 5/2002 | Schoenhard |
| 6,455,789 B1 | 9/2002 | Allison |
| 6,634,508 B1 | 10/2003 | Ishigaki |
| 6,758,150 B2 | 7/2004 | Ballantine et al. |
| 7,301,060 B2 | 11/2007 | Appel et al. |
| 7,311,509 B2 | 12/2007 | Lupke |
| 7,476,296 B2 | 1/2009 | Appel et al. |
| 7,692,050 B2 | 4/2010 | Adams et al. |
| 7,771,699 B2 | 8/2010 | Adams et al. |
| 7,906,695 B2 | 3/2011 | Giercke |
| 8,003,833 B2 | 8/2011 | Appel et al. |
| 8,200,238 B2 | 6/2012 | Gildea |
| 8,215,477 B2 | 7/2012 | Basaglia et al. |
| 8,304,590 B2 | 11/2012 | Hopkins et al. |
| 8,365,812 B2 | 2/2013 | Al-Hadhrami |
| 8,372,248 B1 | 2/2013 | Sherry |
| 8,518,218 B2 | 8/2013 | Ali et al. |
| 8,548,501 B2 | 10/2013 | Gildea |
| 8,574,325 B2 | 11/2013 | Jensen et al. |
| 8,801,904 B2 | 8/2014 | Miller et al. |
| 8,809,606 B2 | 8/2014 | Appel et al. |
| 8,877,992 B2 | 11/2014 | Appel et al. |
| 9,045,693 B2 | 6/2015 | Wolfe |
| 9,052,109 B1 | 6/2015 | Fowler |
| 9,220,798 B2 | 12/2015 | McKee et al. |
| 9,275,655 B2 | 3/2016 | Wilson et al. |
| 9,624,439 B2 | 4/2017 | Bakaya et al. |
| 9,630,345 B2 | 4/2017 | Alsewailem |
| 9,795,940 B2 | 10/2017 | Miller et al. |
| 9,868,597 B2 | 1/2018 | Henry et al. |
| 2002/0048523 A1 | 4/2002 | Achtelik et al. |
| 2003/0047437 A1 | 3/2003 | Stankevitch |
| 2004/0003481 A1 | 1/2004 | Tarrant |
| 2004/0144698 A1 | 7/2004 | Hilpert et al. |
| 2006/0211899 A1 | 9/2006 | Lee |
| 2007/0179326 A1 | 8/2007 | Baker |
| 2007/0193408 A1 | 8/2007 | Martinez |
| 2008/0105141 A1 | 5/2008 | Duperon |
| 2008/0128259 A1 | 6/2008 | Kostek et al. |
| 2008/0202983 A1 | 8/2008 | Smith |
| 2008/0286557 A1 | 11/2008 | Tucker |
| 2010/0008836 A1 | 1/2010 | Pecci |
| 2010/0024696 A1 | 2/2010 | Cauley et al. |
| 2010/0200229 A1 | 8/2010 | Jefferd |
| 2010/0289175 A1 | 11/2010 | Feichtinger et al. |
| 2011/0290057 A1 | 12/2011 | Corcoran |
| 2012/0024106 A1 | 2/2012 | Brotzki |
| 2012/0024687 A1 | 2/2012 | Bratina et al. |
| 2012/0261247 A1 | 10/2012 | McNamara et al. |
| 2013/0299333 A1 | 11/2013 | Tucker et al. |
| 2014/0054815 A1 | 2/2014 | Houk et al. |
| 2014/0121426 A1 | 5/2014 | Tandon |
| 2014/0332363 A1 | 11/2014 | McGolden |
| 2015/0023826 A1 | 1/2015 | Desiron |
| 2015/0053542 A1 | 2/2015 | Liang |
| 2015/0064297 A1 | 3/2015 | Yang |
| 2015/0073181 A1 | 3/2015 | Gorke et al. |
| 2015/0080624 A1 | 3/2015 | Gephart et al. |
| 2015/0166911 A1 | 6/2015 | Reed |
| 2015/0259603 A1 | 9/2015 | Hallowell et al. |
| 2016/0068771 A1 | 3/2016 | Appel et al. |
| 2017/0036378 A1 | 2/2017 | Yanev et al. |
| 2017/0218278 A1 | 8/2017 | Bakaya et al. |
| 2017/0283707 A1 | 10/2017 | Gephart et al. |
| 2017/0361329 A1 | 12/2017 | Behrens et al. |
| 2017/0361558 A1 | 12/2017 | Tenore et al. |
| 2018/0056262 A1 | 3/2018 | Miller et al. |

FOREIGN PATENT DOCUMENTS

| | | |
|---|---|---|
| KR | 20030051913 | 7/2003 |
| KR | 10-0686370 | 2/2007 |
| KR | 100686370 B1 | 2/2007 |
| KR | 1020090117377 A | 11/2009 |
| WO | 01/05910 A1 | 1/2001 |
| WO | 0105910 A1 | 1/2001 |
| WO | 2008017953 A2 | 2/2008 |
| WO | 2009/129233 A2 | 10/2009 |
| WO | 2009129233 A2 | 10/2009 |

OTHER PUBLICATIONS

Search Report and Written Opinion received in PCT Application No. PCT/IB2017/053713 dated Sep. 20, 2017.

(56) References Cited

OTHER PUBLICATIONS

Search Report and Written Opinion received in PCT Application No. PCT/IB2017/053714 dated Sep. 20, 2017.
Search Report and Written Opinion received in PCT Application No. PCT/IB2017/052811 dated Aug. 7, 2017.
Search Report and Written Opinion received in PCT Application No. PCT/IB2017/053667 dated Sep. 12, 2017.
Search Report and Written Opinion received in PCT Application No. PCT/IB2017/054058 dated Nov. 9, 2017.
U.S. Office Action dated May 3, 2018 in U.S. Appl. No. 15/062,319.
U.S. Office Action dated Jun. 6, 2018 in U.S. Appl. No. 15/641,471.
Office Action received in U.S. Appl. No. 15/641,471 dated Feb. 12, 2018.
Office Action received in U.S. Appl. No. 15/062,319 dated Feb. 2, 2018.
Non-Final Office Action in corresponding U.S. Appl. No. 15/477,312 dated Sep. 17, 2018.
Non-Final Office Action in corresponding U.S. Appl. No. 15/054,903 dated Oct. 3, 2018.
Non-Final Office Action in corresponding U.S. Appl. No. 15/593,579 dated Oct. 3, 2018.
Non-Final Office Action in corresponding U.S. Appl. No. 15/641,471 dated Oct. 25, 2018.
Office Action received in U.S. Appl. No. 15/628,844 dated Feb. 26, 2019.

* cited by examiner

CYCLONIC CONDENSING AND COOLING SYSTEM

CROSS-REFERENCE TO RELATED APPLICATIONS

This application claims benefit of priority of U.S. patent application Ser. No. 15/054,903, entitled, "CYCLONIC COOLING SYSTEM" filed May 12, 2016 of which the present application is a continuation-in-part application. The entire content and disclosure of this patent application is incorporated herein by reference in its entirety.

This application makes reference to U.S. Provisional Patent Application No. 62/089,628, entitled "CYCLONIC CONDENSATION SYSTEM," filed Dec. 9, 2014. The entire content and disclosure of this patent application is incorporated herein by reference.

BACKGROUND

Field of the Invention

The present invention relates generally to a device for heat exchanged technology. More particularly, it relates to a device for economically condensing hydrocarbon vapors in a renewable energy plant

Background of the Invention

The use of heat exchangers as cooling systems is well established in industry. Examples of known devices include U.S. Pat. No. 4,858,681 to Sclzberger, U.S. Pat. No. 8,365,812 to Al. Hadhrami, U.S. Pat. No. 4,060,127 to Savin et. al., U.S. Pat. No. 3,168,136 to Ammon, and U.S. Pat. No. 3,258,068 to Hollister. These patents teach multi-stage heat exchangers to slowly cool a vapor. The disclosed systems of these patents use condensers that are bolted end to end on a slope so any liquid accumulating as a result of vapor condensation will flow down a slope or gradient.

However, existing designs of convention systems often require an inordinate amount of space to accommodate the structure of the cooling system. In addition, such conventional cooling system configurations merely produce a low surface area inside the condensers thereby limiting their efficiency. Furthermore, the aforementioned designs do not allow for easy linkage and communication of its components such as in a daisy-chain configuration design. As a result, condensation of usable and re-useable fuel vapors may not be optimized. Accordingly, prior art designs may lead to char build-up and plugging of internal tubes within the condenser thereby reducing effectiveness of the system.

Thus, there is a need for producing a more efficient heat exchange cooling system that provides capability for optimizing usable and re-usable fuel vapors. There is also a need for providing improved systems that reduce contaminants without employing added expenditures of additional equipment (such as external heat sources, electrical input or cooling media apparatus) for achieving the same.

SUMMARY

According to first broad aspect, the present invention provides an apparatus for processing reusable fuel comprising a first-type cyclone cooler having a first configuration. The apparatus also provides one or more second-type cyclone coolers, wherein each one or more second-type cyclone coolers has a substantially identical second configuration to respective other one or more second-type cyclone coolers, wherein the second configuration is different than the first configuration. The apparatus may also provide an air cooled heat exchanger, a coil condenser and one or more bubblers. The first-type cyclone cooler and the one or more second-type cyclone coolers are connected. One of the one or more second-type cyclone coolers is connected to the air cooled heat exchanger. The air cooled heat exchanger is connected to the coil condenser. The coil condenser is connected to the one or more bubblers.

According to a second broad aspect, the present invention provides an apparatus for processing reusable fuel comprising a first-type cyclone cooler having a first configuration. The apparatus may also provide one or more second-type cyclone coolers, wherein each one or more second-type cyclone coolers has an identical second configuration, wherein the second configuration is different than the first configuration. The apparatus may include an air cooled heat exchanger, a coil condenser, and one or more bubblers. The one or more second-type cyclone coolers comprise a first set of turning fins arranged in a first direction. The one or more second-type cyclone coolers comprise a second set of turning fins arranged in a second direction from the first direction. The first-type cyclone cooler and the one or more second-type cyclone coolers are connected. The one of the one or more second-type cyclone coolers is connected to the air cooled heat exchanger. The air cooled heat exchanger is connected to the coil condenser. The coil condenser is connected to the one or more bubblers.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present invention, the term "comprising", the term "having", the term "including," and variations of these words are intended to be open-ended and mean that there may be additional elements other than the listed elements.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing FIGS. may be flipped over, rotated by 90° in any direction, reversed, etc.

For purposes of the present invention, a value or property is "based" on a particular value, property, the satisfaction of a condition, or other factor, if that value is derived by performing a mathematical calculation or logical decision using that value, property or other factor.

For purposes of the present invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For the purposes of the present invention, the term "ambient air temperature" refers to generally to the temperature of the surrounding environment and more particularly the temperature of the surrounding environment of the disclosed cyclonic condensing and cooling system.

For the purposes of the present invention, the term "bubbler" refers to an apparatus that directs gas flow beneath a liquid in which gas bubbles through a liquid to filter, scrub and/or dissolve out harmful gasses/pollutants. In addition, the bubbler may serve as a back flame arrestor or a back pressure regulator.

For the purposes of the present invention, the term "coil condenser" refers to a coiled tube utilized as the basic energy exchange medium between a vapor to be condensed and a liquid to be condensed. Typical surrounding liquids that may be utilized to achieve lower freezing points or inhibit rust build up may include water or water mixed with glycol.

For the purposes of the present invention, the term "chiller" refers to an external refrigeration unit used to lower/reduce the temperature of a liquid used in condensation to be subsequently pumped such as through a coil condenser.

For the purposes of the present invention, the term "cyclone cooler" refers to a non-electric drawing condensing device that rotates air mass in a cyclonic rotation. In application the cyclonic rotation may include a rapid inward circulation of air masses about a low-pressure center.

For the purposes of the present invention, the term "daisy chain configuration" refers to an assembly wherein components are connected in sequence. The sequential connection may include a series configuration of connections of several components wherein one component is connected to the next component in line.

For the purposes of the present invention, the term "fin" refers to a thin component or appendage attached to a larger body or structure. Fins typically function as foils that produce lift or thrust, or provide the ability to steer or stabilize motion while traveling in water, air, or other fluid media. Fins are also used to increase surface areas for heat transfer purposes.

For the purposes of the present invention, the term "heat exchanger" refers to a device designed to transfer heat from one matter to another. In application, the heat exchanger may be utilized to transfer heat between a solid object and a fluid (a liquid or a gas), or between two or more fluids. The fluids may be separated (such as by a solid wall) to prevent mixing or they may be in direct contact.

For the purposes of the present invention, the term "identical" refers to being similar in every detail; exactly alike.

For the purposes of the present invention, the term "flash point" of a volatile material refers to the lowest temperature at which vapors of the material will ignite when given or exposed to an ignition source.

For the purposes of the present invention, the term "naphtha" refers to any of several highly volatile, flammable liquid mixtures of hydrocarbons distilled from petroleum, coal tar, and natural gas and used as fuel, as solvents, and in making various chemicals. Also called benzine, ligroin, petroleum ether, white gasoline.

For the purposes of the present invention, the term "series" refers to a number of things coming one after another in spatial or temporal succession.

For the purposes of the present invention, the term "scrubber" refers to a device used to remove and/or dissolve undesirable pollutants from a gas or exhaust stream.

For the purposes of the present invention, the term "substantially" refers to to a great or significant extent; for the most part; essentially.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Fractionation includes the separating of a mixture of hydro-carbon chains into a group of carbon chains or fractionations. Thermal cracking is the process used by refineries to break down carbon chains of petroleum compounds so that the desired carbon compound can be achieved. This process typically involves high heat, distillation, re-boiling, and energy intensive cooling processes. This application discloses an invention that will condense vapor produced by a reactor (e.g., a pyrolysis reactor). In doing so, the disclosed system utilizes a standard cyclone; a plurality of specialized cascading cyclones with internal cyclonic rotation fins that force incoming vapor to maintain a fixed amount of rotation regardless of the vapor's velocity, heat sinks that increase condensation, reversing fins that force gases to reverse direction inside the cyclone decreasing vapor velocity to increase heat loss; a main collection tank that allows for the controlling of the fuel flash point; a compact low temperature coil cooler that uses 100 percent of the cooling surface that allows for the production of higher quality fuel; and, bubblers/scrubbers that produce back pressure into the pyrolysis reactor.

The disclosed subject matter improves on heat exchanged technology by providing a more efficient heat exchange cooling system that provides capability for optimizing usable and re-usable fuel vapors. Such vapors may be captured and utilized on any device able to run on gaseous fuel such as any non-condensable petroleum fuel.

In addition, the disclosed subject matter discussed herein differs from the prior art as it employs modified rotation fins, internal cyclone heat sinks, forced gas direction reversal inside of each cyclone, the ability to control fuel flash points without an external heat source, separation of the collected fuels without an external het source, and compact low temperature coil cooler that uses one hundred percent of the cooling surface.

Furthermore, the disclosed subject matter employs a daisy-chain design configuration so that the condensation of usable re-useable fuel vapors in optimized. The disclosed cyclonic condensing and cooling system is part of a re-useable energy technology and the prior art designs would lead to Char build-up and plugging of the tubes within the condenser reducing effectiveness.

Figure 1:
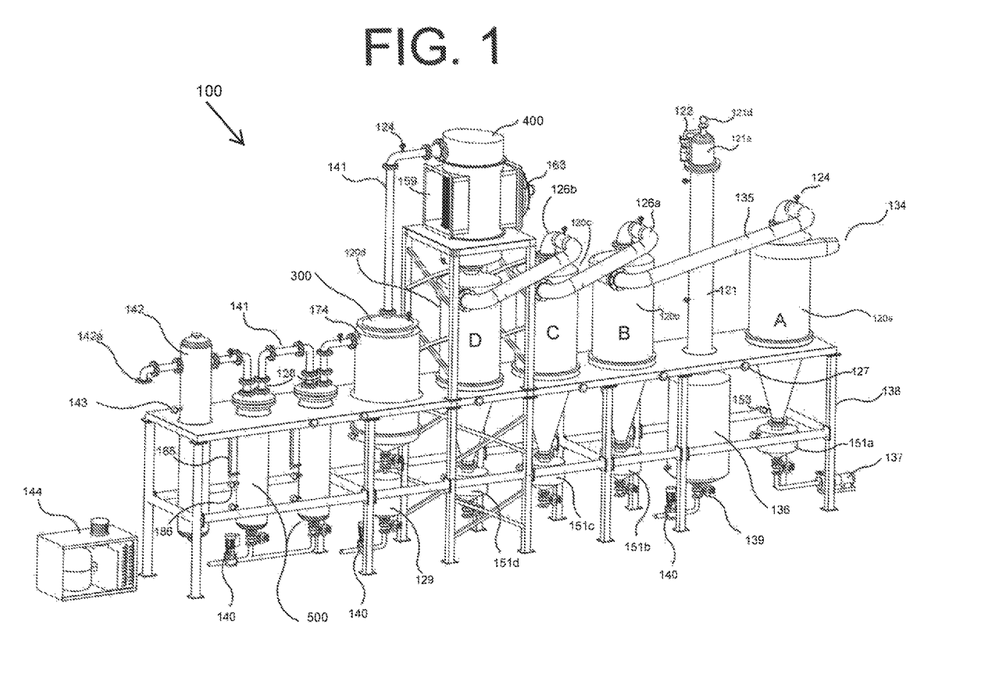
FIG. 1 is a schematic illustration of a cyclonic condensing and cooling system according to one embodiment of the present invention.

Turning to FIG. 1, the disclosed subject matter is directed to a cooling system consisting of a plurality of cyclone coolers (e.g., one standard cyclone cooler and one or more specialized cyclone coolers) thereby forming the disclosed cyclonic condensing and cooling system 100. According to disclosed embodiments, the standard cyclone cooler may be considered to be a first-type cyclone cooler having a first configuration, as explained herein. The one or more specialized cyclone coolers may be considered to be second-type cyclone coolers. Thus, the one or more second-type coolers may have a substantially identical second configurations to respective other one or more second-type cyclone coolers, as explained below. Yet, the first-type cyclone cooler having the first configuration is different from the second-type cyclone coolers having the second configurations, as explained below.

By way of example, one standard cyclone cooler is depicted as A in FIG. 1. In an exemplary embodiment three specialized cyclone coolers are illustrated as B, C and D in FIG. 1. Each of the specialized cyclone coolers B, C and D are of the type illustrated, for example, in FIG. 2. An exemplary embodiment of the standard cyclone cooler may comprise a first configuration. An exemplary embodiment of the specialized cyclone coolers may comprise a second configuration, each of the second configurations being alike one another but different from the first configuration of the standard cyclone cooler. The disclosed cyclonic condensing and cooling system 100 may include a chiller 300, an air heat exchanger 400, two liquid bubblers/scrubbers 500, a main holding or main liquid fuel collection tank 136, and an expansion tank 142.

In an exemplary application, a pyrolysis reactor processes plastic waste material which may be shredded and fed therein. Applying heat above 350 degrees Celsius will cause the shredded plastic material to melt and vaporize. The up-stream reactor requires back pressure to assist in the thermal cracking of the carbon chains present in the plastic material. The cyclonic condensing and cooling system 100 may be employed to produce the required back pressure required by the pyrolysis reactor. Such back pressure is achieved due to the static friction of the pipe and cyclone coolers of the disclosed subject matter in addition to the water column pressure produced in the bubblers/scrubbers 500 (e.g., depicted in FIG. 5).

Turning to FIG. 1, the first cyclone cooler is illustrated at 120a. First cyclone cooler is a standard cyclone cooler. A standard cyclone cooler consists of an inlet section, body wall, cone to discharge and an internal tube. When the vapor or gas stream enters the cyclone it rotates around the body and down the cone, then up through the tube and out of the cyclone. The amount of rotation on the incoming gas, dictates the amount of rotation and centripetal force it produces and particles being conveyed with the gas. This force separates the particles from the gas and drops through the cone, then out of the cyclone. The gas rotates and drops down the cone, increasing in velocity and pressure due to the smaller and smaller diameter on the cone. This action packs the gas stream at the bottom of the cone and forces it to rise back up and through the internal tube, then out of the cyclone to the next cyclone. The rotations of the vapor within first cyclone cooler 120a are based on the velocity of the gas as it enters first cyclone cooler 120a. In the disclosed subject matter, a cyclone inlet is depicted in FIG. 1 at 134 and FIG. 2 at 134. Inlet 134 has a diameter of about 6 inches wherein its inlet velocity can accommodate a vapor or gas stream of about 3,234 feet per minute based upon the pyrolysis reactor's rate capability based upon the following values: approximately 2,000 pounds of shredded plastic material processed per hour at about 1,150 degrees Fahrenheit. As the pyrolysis reactor has about a 7 percent char rate, the remaining volume of shredded plastic processed (after the char is removed) is about 1,860 pounds per hour processed into a gaseous state. The gas weighs 0.78 ounces per cubic foot. Thus, standard cyclone cooler 120a receives gas at a rate of about 635 cubic feet per minute. The ambient temperature is assumed to be about 70 degrees Fahrenheit for purposes of exposure to heat loss.

The vapor remains in first cyclone cooler 120a for about 4 seconds. This allows for a heat loss of between about 3 and 8 degrees Fahrenheit. The fuel collected at a bottom 151a of first cyclone cooler 120a contains carbon chains that are C-28 or larger. First cyclone cooler 120a also collects large char particles that may have travelled into cyclonic condensing and cooling system 100. These char particles will drop out of the vapor stream and will be deposited to the discharge hopper at the bottom 151a where it mixes with fuel containing carbon chains that are C-28 and larger. This fuel char mixture may be returned and re-fed into the pyrolysis reactor for further thermo cracking via a high temperature pump 137. The vapors leaving standard cyclone cooler 120a are traveling at a velocity of about 3,224 feet per minute and will travel through a cross over pipe 135 for about 2.9 seconds. Due to the thin wall of cross over pipe 135, heat loss of the vapor as the vapor travels through cross over pipe 135 will be approximately 2 degrees Fahrenheit. This heat loss lowers the inlet vapor volume of the vapor entering the second cyclone cooler 120b.

Figure 2:
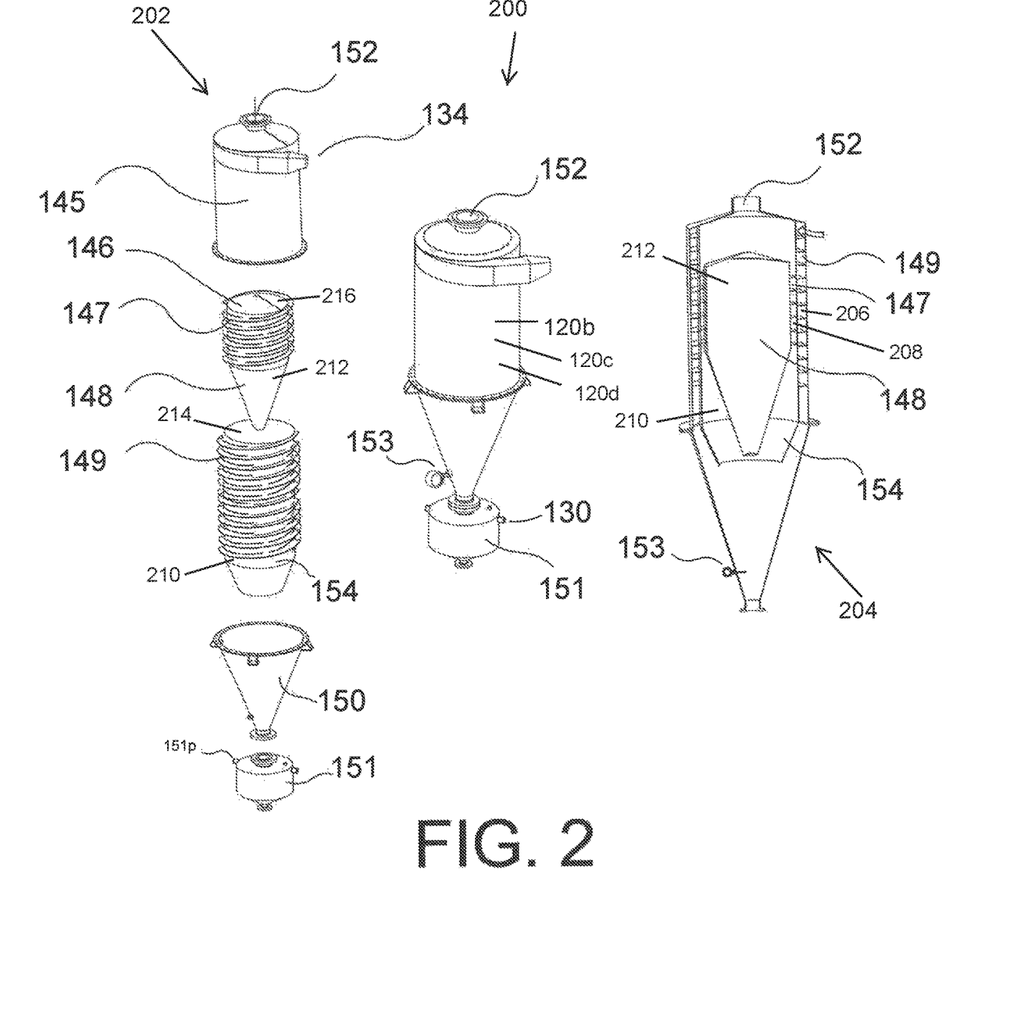
FIG. 2 illustrates an assembled, an exploded and an internal view of cyclones B, C, and D of FIG. 1 according to one embodiment of the present invention.

Turning to FIG. 2, a cross section of specialized cyclone coolers 120b, 120c, and 120d (second cyclone cooler, third cyclone cooler and fourth cyclone cooler, respectively) of FIG. 1 illustrates the internal structure of specialized cyclone coolers (120b, 120c, and 120d) that forces gas vapors to follow a cyclonic path to maximize vapor contact with outer the outer body of the cyclone cooler (that is contiguous to ambient temperature) in order to dissipate heat and to effect condensation.

Accordingly, second cyclone cooler 120*b* (FIGS. 1 and 2) is a specialized cyclone cooler constructed with a unique configuration different from the standard/first cyclone cooler 120*a*. As illustrated in FIG. 2, second cyclone cooler assembly 120*b* is illustrated in an assembled view 200, and exploded view 202 and an internal view 204. Second cyclone cooler may include a body portion 145 joined to a cone 150 in a final assembled state. Contrary to the standard cyclone cooler, the second cyclone cooler has additional internal components in a disclosed arrangement of the disclosed subject matter. Specifically, in connection, body portion 145 and cone 150 house an internal structure or internal tube comprising an outer tube structure 210 and inner tube structure 212. Inner tube structure may be regarded as an inner filler drum 148. Outer tube structure 210 has a cavity 214. In a final assembly, inner tube structure 212 is disposed within a cavity 214 of outer tube structure 210. Inner tube structure 212 comprises a cavity 216 for accommodating disbursed gases therethrough.

The body 154 of outer tube structure 210 includes a first set of turning fins 149 disposed along its exterior in a first rotational direction, as described below. A configuration of turning fins 149 may include an internal cyclonic rotation fin configuration. Inner tube structure 212 includes a second set of turning fins 147 disposed along its exterior traversing in a second rotational direction. A configuration of turning fins 147 may include an internal cyclonic rotation fin configuration. In one embodiment, the second rotational direction may include a reverse or opposite cyclonic rotational fin direction to turning fins 149, as further described below.

Thus, in a final assembly, inner tube structure is disposed in cavity 214 of outer tube structure 210 to form an internal tube assembly. The internal tube assembly is further disposed within the cavity of the joined body portion 145 and cone 150. In the final assembly configuration, a first channel 206 is formed between an exterior of the outer tube structure 210 and the interior of the body portion 145. Additionally, a second channel is formed between an exterior of the inner tube structure 212 and an interior of the outer tube structure 210 within cavity 214. Turning fins 149 are disposed within first channel 206 in a first direction and turning fins 147 are disposed within second channel 208 in the second direction, as discussed below.

Figure 7:
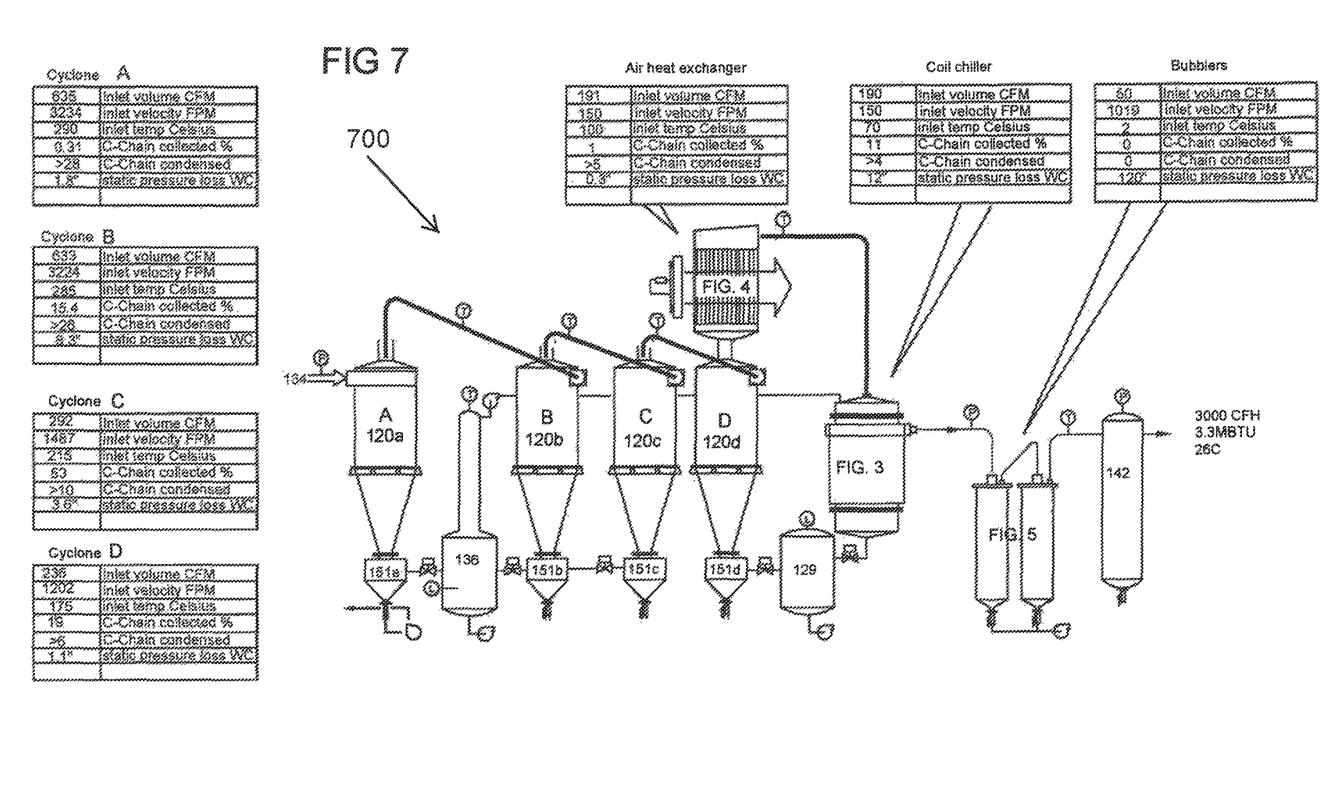
FIG. 7 is a schematic of the process flow of the condensing/cooling process according to one embodiment of the present invention.

In select embodiments, the disclosed subject matter provides second cyclone cooler 120*b* designed with about 158 feet of turning fins 149. The distance between turning fins 149 is about 4 inches (the pitch) with the width of the flight being about 3 inches. Turning fins 149 may be designed having 12 spiral rotations with a 36 inch outside radius. Fins 147 placed on inner tube structure 212 may include 6 spiral rotations with the same pitch and width as turning fins 149. Turning fins 149 are attached inside the body 145 of second cyclone cooler 120*b* to force the amount of rotations of received gases. This makes the gases come into contact with body 145 a fixed amount of times before entering a cone 150 disposed below. The travel time through second cyclone cooler 120*b* is about 3.8 seconds based on the process rate of the reactor of about 2000 pounds of shredded plastic per hour. There is heat loss in second cyclone cooler 120*b* due to the friction produced by fins 149 as the fins act as heat sinks. As vapors cool, they condense and lose volume; loss of volume reduces the velocity of gas reducing its velocity and creating more retaining time. This assists in further heat loss within the cyclone coolers. (FIG. 7 provides a schematic of the remaining cyclonic cooling system calculated losses for the disclosed subject matter.)

Third cyclone cooler 120*c* (FIGS. 1 and 2) is identical to second cyclone cooler 120*b*. Likewise, third cyclone cooler 120*c* is a specialized cyclone cooler being constructed with a unique configuration different from the standard/first cyclone cooler 120*a*. The process involved in third cyclone cooler 120*c* is identical to second cyclone cooler 120*b*; third cyclone cooler 120*c* being designed and constructed in the same manner as second cyclone cooler 120*b*. In operation, vapors leave second cyclone cooler 120*b* and travel to third cyclone cooler 120*c* via cross over pipe 126*a*. The cooling process continues reducing the volume of the vapor and reducing the velocity of the vapor.

Fourth cyclone cooler 120*d* (FIGS. 1 and 2) is identical to second cyclone cooler 120*b* and third cyclone cooler 120*c*. Likewise, fourth cyclone cooler 120*d* is a specialized cyclone cooler being constructed with a unique configuration different from the standard/first cyclone cooler 120*a*. Fourth cyclone cooler 120*d* is designed and constructed in the same manner as second cyclone cooler 120*b* and third cyclone cooler 102*c*. In operation, vapors leave third cyclone cooler 120*c* and travel to fourth cyclone cooler 120*d* via cross over pipe 126*b*. The cooling process continues reducing the volume of the vapor and reducing the velocity of the vapor. A design configuration of fourth cyclone cooler 120*d* may allow vapor to leave this cyclone and enter into a forced air heat exchanger 400 (see, FIGS. 1 and 4). In an exemplary design, forced air heat exchanger (air cooled condenser) 400 has a total cross sectional area of about 1600 square inches inside the oval flatten tubes. This high surface area increases the reaction time and slows the velocity of the remaining gas stream to about 150 feet per minute and reduces the heat dramatically from approximately 100 degrees Celsius to 70 degrees Celsius due to the ambient air temperature. This creates a large amount of condensation that is collected inside oval flatten tubes 157 and allowed to drip back into fourth cyclone cooler 120*d* disposed located directly below. This returning liquid fuel, in turn, further cools the vapor leaving third cyclone cooler 120*c*. The vapor travels through forced air heat exchanger 400 and is pushed into chilled cooling coils of coil condenser 300 (FIGS. 1 and 3) via pipe 141.

Figure 3:
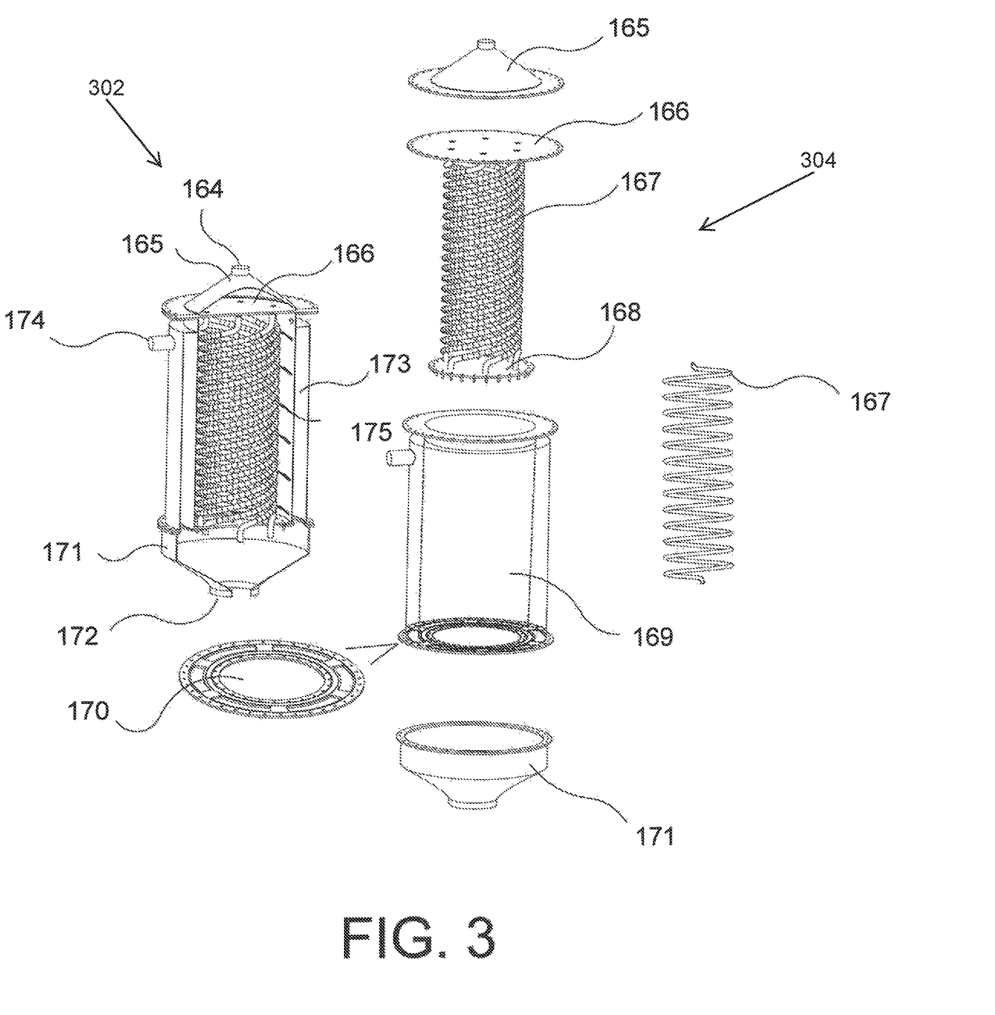
FIG. 3 illustrates an assembled view, an exploded view and an internal view of a coil condenser according to one embodiment of the present invention.
Figure 4:
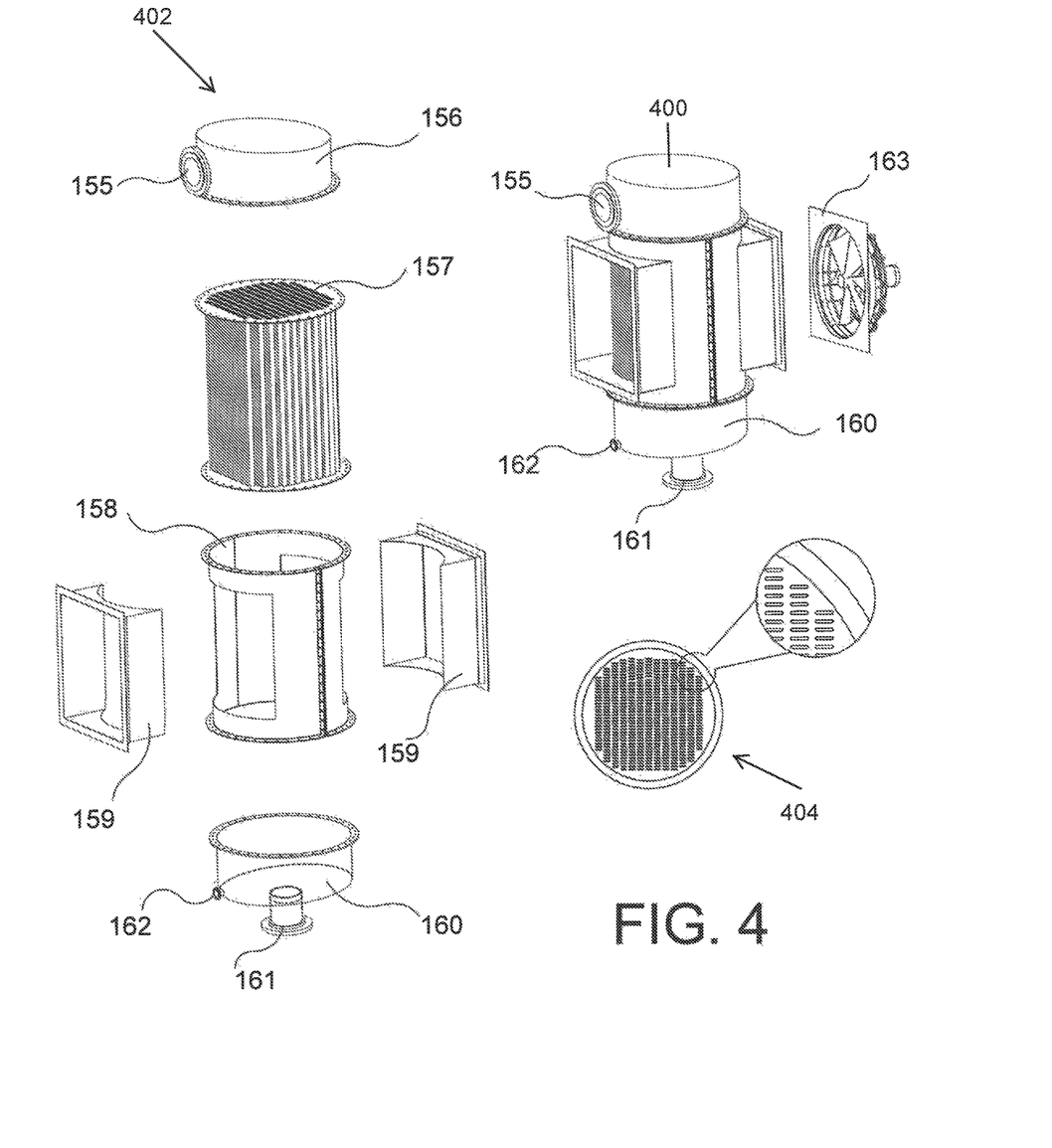
FIG. 4 illustrates an assembled and exploded view of a forced air cooling/condensing system according to one embodiment of the present invention.

Turning to FIG. 3, an internal configuration 302 and exploded view 304 of coil condenser 300 is illustrated. Coil condenser 300 serves as a short carbon chain condensing unit. In an exemplary embodiment, coil condenser 300 is a cooler that is constructed with six internally coiled 1 inch tubes 167 that are submerged through a tank of chilled glycol 169. The six 1 inch diameter stainless steel round tubes are in the form of a spiral. The spiral reduces the overall length of the 1 inch tubing from sixty feet where it is contained in an apparatus that is about five feet in height. The six coils are generally arranged evenly around each other in a circular pattern. This creates an even distribution of the flowing gases inside the coils. The spiral shape assists in the slowing of the incoming vapors by the use of turning static pressure. These coils are attached through a top and bottom flange plate 170. This assembly is inserted into a drum housing 169 with matching flanges 168 and 169. The drum housing 169 is filled with a glycol product that acts as the media for the heat exchange. The glycol remains present inside this drum. A cooling coil 167 is introduced into the drum which cools the glycol. In turn the glycol cools the 1 inch tubing that is carrying the vapors inside.

Cooling coil 167 is attached to a standard refrigeration system 144 (FIG. 1) and remains closed loop through the glycol drum 169. The vapors pass through cooling coil 167, allowing condensation to drip into the collection chamber 171. The vapor that does not turn into condensation exits the coil condenser at 174 after the vapor circles the glycol drum. The flange connection 170 at the bottom of the glycol drum allows the liquid to go in one direction and gas to go in another. The chamber 173 between the glycol drum and the housing is the location of where the vapors travel to the gas outlet at 174. This zone also sees the glycol temperature on the outside of the glycol drum 169 to further cool the vapor. The condensed vapor that exits coil condenser 300 as a liquid is collected in a smaller or secondary tank 129 (FIG. 1) and pumped to storage.

Coil condenser 300 is designed with bolted flange connections for access and service to all components of this equipment. Each cyclone cooler and the coil chiller has a tank or collection hopper below them (FIG. 1 at 151*a*, 151*b*, 151*c*, and 151*d*). In the case of the cyclone coolers, the collection discharge hopper (FIG. 1 at 151*a*, 151*b*, 151*c*, and 151*d*) has a drain port, level indicator (FIG. 1 at 153) coupling connection and a fuel outlet port (spill over) (FIG. 2 at 151*p*). The spillover 151*p* allows for the build-up of collected fuel to be discharged into a respected holding tank.

Figure 6:
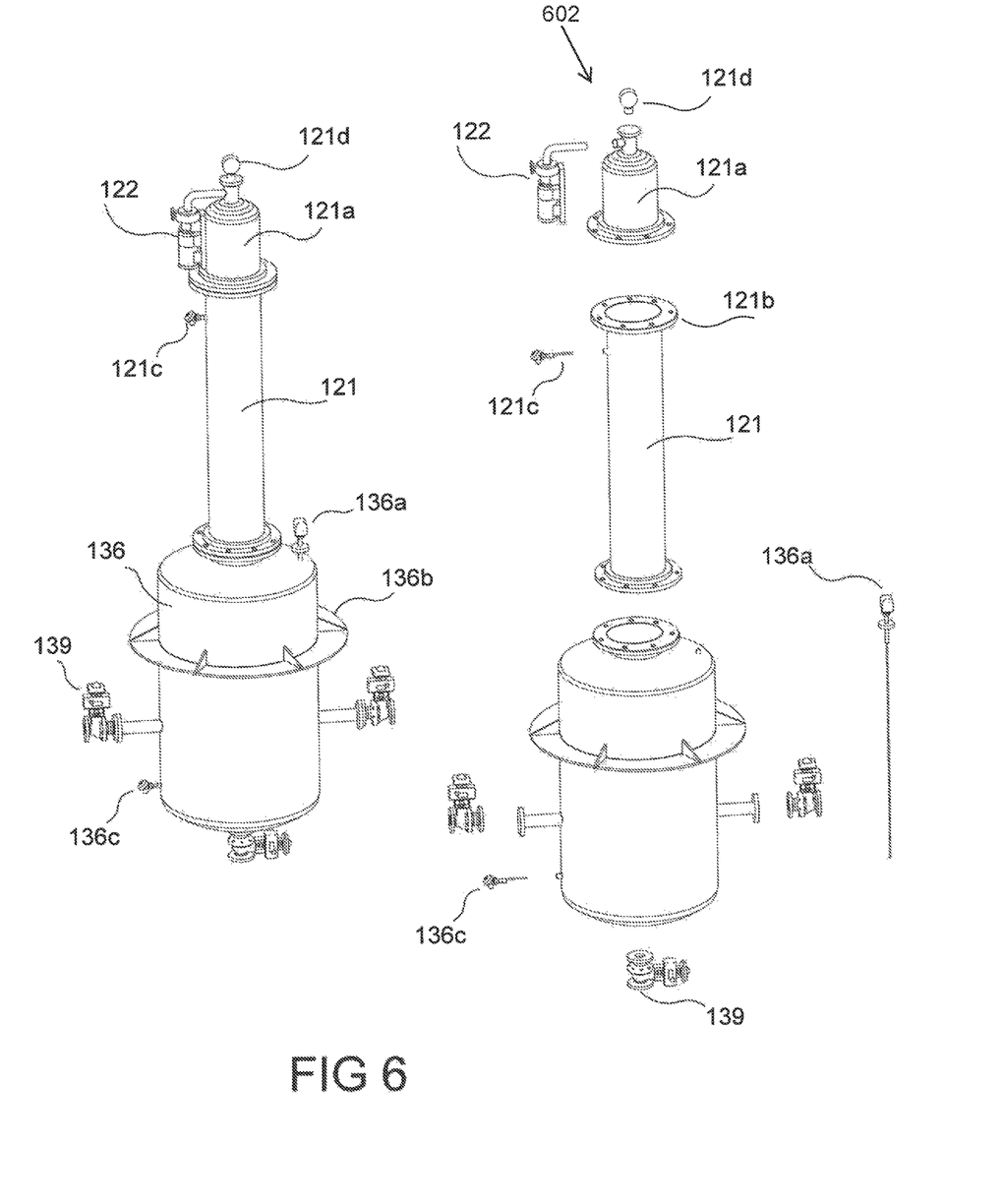
FIG. 6 illustrates an assembled and exploded view of a main liquid fuel collection tank and a flash tank for removal of hydro-carbon gases according to one embodiment of the present invention.

The first three cyclones coolers 120*a*, 120*b*, and 120*c* discharge into a first hold tank also regarded as the main holding tank 136 via control ball valves 139 (FIGS. 1 and 6). The fourth cyclone 120*d* discharges in smaller or second holding tank also regarded as secondary tank 129 that is located beneath the chilling coil of coil condenser 300. According to the disclosed subject matter, smaller or secondary tank 129 receives the lighter, cooler collected fuels. The lighter or cooler collected fuels may include lighter or shorter carbon chains (i.e., gasoline, naptha) as opposed to diesel which has longer carbon chains. Main holding tank 136 collects heavier heated fuels (i.e., those fuels having a higher boiler point). Disclosed embodiments provide that main holding tank 136 collects the heavier heated fuels as being filled from the cyclone coolers 120*a*, 120*b*, and 120*c*. Higher temperature fuels are regarded as those fuels having higher boiling points and higher flash point e.g., above 40 degrees Celsius. Although the first three cyclone coolers 120*a*, 120*b*, and 120*c* collect higher temperature fuels, some amount of light fuel (like benzene) may also be collected. The lighter fuels will vaporize from the heat of the holding fuels inside main holding tank 136 and drift up the tank column 121. A pump 122 located at the top of the expansion column 121 will pull these vapors from main holding tank 136 before they can re-condense and force them into coil condenser 300. This allows for the collection of fuel of higher quality in main holding tank 136 by rising the flash point on the collected fuel. Disclosed cyclones coolers A, B, C, D all work together to collect fuels having a range of carbon to carbon chain structure. In accordance with disclosed embodiments, the configuration of cyclonic condensing and cooling system 100 allows heavier heated fuels to be collected by cyclone coolers A, B, C, and D while the lighter fuel is capable of being collected in coil condenser 300.

Figure 5:
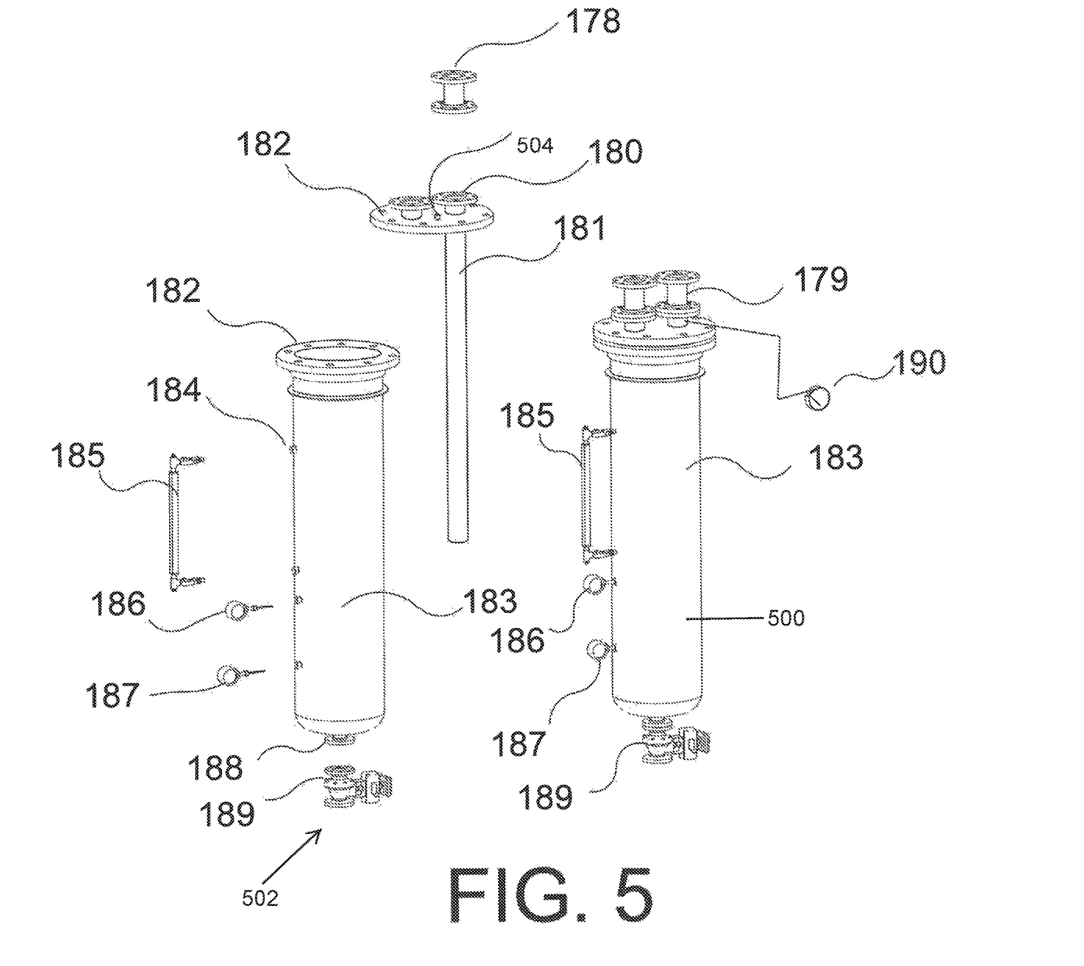
FIG. 5 illustrates an assembled and partially assembled view of a scrubber/bubbler unit according to one embodiment of the present invention.

The chilled gases leave coil condenser 300 and travel to two bubbler tanks 500 that are connected in sequence through pipe connection 141. These tanks have an extended pipe from the inlet port that is submerged under the liquid water line FIG. 5 at 181. This submerged pipe 181 causes back pressure to the system by the resistance of the liquid in the bubbler tank. This is referred to as water column pressure. By using two tanks to achieve the water column pressure, the height can be divided. These bubbler tanks can contain different liquid components as needed to remove any contaminants in the remaining vapors. As illustrated in FIG. 5, the first tank is designed to hold water and is equipped with a level indicator 186 and a PH meter 187 to monitor the condition of the water. Water is used to remove sulfur and the buildup of sulfur will indicate a change in the PH. The second bubbler contains caustic soda. This will capture any chlorine gas in the vapors. This tank also has a PH meter 187 and is also equipped with a level indicator 186 and level sensor.

The last tank on cyclonic condensing and cooling system 100 is a standard expansion tank 142. Expansion tank 142 is also designed to catch any liquid droplets that may travel through cyclonic condensing and cooling system 100. Pressure sensors and indicators monitor the reactor pressure from this point in the system.

In operation, the as gases are received within the disclosed cyclonic condensing and cooling system 100, embodiments of the disclosed subject matter force rotations of the gases through the system. Throughout rotation, the hot gases will lose heat from thermo contact loss with the outside body wall 145. In accordance with the design of the disclosed subject matter, the incoming gasses are channeled down first channel 206 in a direction commensurate with a first rotational direction enabled by turning fins 149 and up second channel 208 commensurate with a second rotational direction mandated by the placement of turning fins 147. In an exemplary embodiment, the second rotational direction may include a reverse rotational direction from the first rotational direction. Prior to traversing up second channel 208, embodiments of the disclosed subject matter allow the gases to pack generally at the bottom of cone 150 like a standard cyclone whereupon they are forced to reverse rotational direction before entering the internal tube (i.e., outer tube structure 210 and inner tube structure 212). This adds to the particle separation, because the gases come to a complete stop before reversing direction, allowing the particles to fall out of the gas stream. The design then uses the cyclone as a separator and a cooler/condenser. As hot gases lose heat, condensation is collected in the cooler area. By controlling the gas resident time inside the cyclone, a fixed condensing temperature can be achieved. By controlling this temperature, fuel can be distilled into c-chain groups between a group of cyclones.

Embodiments of the disclosed cyclonic condensing and cooling system provide four cyclone coolers in series (FIG. 1 at 120*a*, 120*b*, 120*c*, and 120*d*). The first cyclone cooler 120*a* collects the larger particles and higher carbon chain fuels only. The next three cyclone coolers 120*b*, 120*c*, and 120*d* separate the fuel grades (e.g., gasoline, petroleum, derived liquid for fuel) based on condensing temperatures. Separated fuels have temperatures which cause vaporization of the fuels to ignite when exposed to an open flame. This process is referred to as a flash point. The lower the carbon chain number in the fuel, the lower the temperature of the liquid fuel, that will cause the fuel to ignite. This temperature will be referred to as the "yield flash indicator" (YFI). In order to increase the YFI, the removal of the lighter carbon chains by use of heat is required.

Each cyclone collects vapor at a lower temperature than the one before it in the gas stream creating its own YFI value. Inside the internal tube FIG. 2 at 154 is a reversed set of fins 147 connected to a filler drum 148 inside the tube. The discharge of each cyclone cooler has a hopper, or discharge tank 151 to store condensed fuels. Each hopper can be directed to a holding tank by selected ball valves. A level indicator 153 is used to start the discharge of the collected fuels. The collection hopper also has a drain valve (FIG. 1 at 139) for cleanout use.

The last cyclone cooler, the fourth, in the series (FIG. 1 at 120d) will have an air contact heat exchanger 400 to insure full ambient cooling. This heat exchanger 400 condenses the last of the ambient temperature fuels and drips it back through the cyclone, acting as a reflux and cooling for the cyclone. The remaining vapors then pass through a coil type chiller 300 via a connecting pipe 141. This is a set of five coils (FIG. 3 at 167) averaging 65 feet in straight length each and wrapped around each other in an even spacing. The coils 167 are set inside a tube filled with glycol 169 for chilling. This glycol is chilled with refrigerated coils 175 from an air conditioner compressor and controlled to maintain the set point temperature. The incoming vapors entering the coil condenser 300 at entrance 164 will condense and drip out of the chiller housing 171. The vapors then turn up from the bottom of the coils and travel to the gas outlet 174. On the way to this outlet port, the gases are again exposed to the cold wall (FIG. 3 at 173) of the glycol chamber (FIG. 3 at 169). This creates an effectiveness of 100% use of the chilling chamber. The remaining gases are considered non-condensable at room temperature. This gas is referred to as syn-gas.

The syn-gas is then passed through two sets or bubbler/scrubbers 500. The first is filled to a fixed point with water. This water acts as a back pressure device, a flame arrester device and a scrubber. Along with the C4, hydrogen and other gases that make up the syn-gas, some unwanted gases also travel with the syn-gas from time to time. Without good control of the plastics entering in the reactor, chorine and sulfur can be introduced. The first bubbler will catch the sulfur in the water producing a weak dibasic acid, $SO_2 + H_2O = H_2SO_3$.

The next bubbler also acts as a back pressure device, flame arrester and scrubber. This time it is filled with caustic soda to scrub chorine. $CI + NaOH = NaClO$ or salt and water. The bubblers 500 are also equipped with a level control 186 so the level of the bubbling liquids is monitored as well as a PH meter 500 at 187 to indicate the condensing on the bubbling/scrubbing liquids.

At this point the syn-gas is ready to be used. Thus, embodiments of the disclosed subject matter provide an improved means for capturing and processing excess gas for use on any device capable of running on gaseous fuel, i.e., non-condensable petroleum fuels. Accordingly, the burners for reactor-type systems are capable of utilizing the fuel of the disclosed subject matter. The syn-gas may also be used to power a generator that could power the electrical system of the reactor. The last item in the cooling system is a finish tank. This tanks act a drip collection if any liquids travel past the bubblers. It also serves as an expansion tank for the syn-gas. When the pressure inside this tank is at set point, the gas is allowed to be used.

Turning to an example design construction of cyclonic condensing and cooling system 100, disclosed embodiments may consist of four cyclones, two fuel tanks, an air cooled radiator, one glycol chilled coil condenser, two bubblers, and one expansion tank all attached to a structural steel frame. The cyclone coolers may be constructed from 10 gauge stainless steel material. This material is selected due to its ability to withstand the internal pressure of the reactor while allowing heat to pass through the metal, cooling the incoming gas. The cyclone coolers consist of a scrolled inlet, flanged body section, internal tube with fixed rotation fins, an interior baffle with reversed rotation fins, a bolted cone with support pads, and a discharge hopper with an outlet port.

The internal rotation fins are welded to one side of the cyclone tube allowing for the condensed liquid to run through the fins to the discharge hopper. The internal tube also has a cone bottom to continue the vapor to pressurize inside the cyclone. Inside the internal tube is a cone drum that acts as a baffle. This baffle also has rotation fins welded to one side. The cone drum baffle has a sloped top to allow for drainage of any condensation that may occur inside. The gas inlet and outlet discharge ports have a flange connection. The cone bottom is equipped with a coupling that acts as a level indicator. The cone bottom has a discharge part with a stub in flange for rotation and connection to the discharge hopper. The discharge hopper has a drain port, two outlet ports and the level indicator coupling.

The cyclone coolers (A, B, C, and D) are piped in a daisy chain configuration. The piping used between cyclone coolers is a thin wall schedule 10 stainless steel pipe with ANSI 150 flanges. This pipe is sloped from one cyclone coolers to the next and downhill to drain any condensation vapors. The last cyclone cooler in the daisy chain configuration has an air cooled heat exchanger connected to the top discharge flange. This air cooled heat exchanger reduces the remaining vapor temperature and allows for liquid to condense and return to the last cyclone where it enters the discharge hopper. This air cooled heat exchanger is constructed from oval-shaped tubing. The oval-shaped tubing is welded to the top and bottom seal plate, openings in the seal plate are welded to the oval-shaped tubing to allow vapors to pass through the inside of the tubing. Housing surrounds the tubing section and connects to an inlet chamber and gas discharge chamber. The fan is connected to the tube section housing. This part of the system uses ambient air and forces it across the outside of the tubing to reduce the inside vapor temperature.

The fuel tanks may be constructed from heavy wall schedule 40 stainless steel pipe with pipe ends and connecting ports as needed to fill and discharge the incoming fuels. The top of the main tank 136 has an expansion column to allow light vapors to be removed from the collected liquids below. The second tank 129 is a standard holding tank with inlet and outlet connections plus a coupling for level indication. The large tank 136 is constructed to allow for high temperature fuel storage and collects from the first three cyclones. The smaller tank 129 will see low temperature fuels and is used to collect fuel from the last cyclone and the coil condenser.

After the vapors leave the air cooled heat exchanger 400 it enters into a chilled coil condenser 300. The coil condenser is located above the small fuel tank 129. The condenser consists of six 1 inch diameter stainless steel round tubes that have been rolled into a spiral. The spiral reduces the overall length of the 1 inch tubing to one tenth the length. The spiral shape also assists in the slowing of the incoming vapors by use of the turning static pressure. The coils are attached through a top and bottom flange plate. This assembly is inserted into a drum housing with matching flanges. The drum housing is filled with a glycol product that acts as the media for the heat exchange. The glycol remains resident inside this drum. A cooling coil is introduced into the drum which cools the glycol. In turn the glycol cools the 1 inch tubing that cools the vapors inside. The cooling coil is attached to a standard refrigeration system and remains closed loop through the glycol drum. The vapors passing through the 1 inch coils, cool, so the coil condenser allows the produced condensation to drip to the bottom in the collection chamber, exiting the device. The special flange connection at the bottom of the glycol drum allows for liquid to go in one direction and gas to go in another. The chamber between the glycol drum and the outside is where the remaining vapors travel. This zone also is cooled by the glycol thus it benefits from double cooling. The coil condenser is designed with bolted flange connections for access and service to all components of this equipment.

The chilled gases leave the coil condenser then travel through two bubbler tanks 500. These tanks have an extended pipe from the inlet port that is submerged under the liquid water line. This submerged pipe causes back pressure to the system by resistance of the liquid in the bubbler tank. This is referred to as water column pressure and by using two tanks the height can be divided between each one. An example is if total water column back pressure is 60 inches in one bubbler and 50 inches in the second bubbler, a total of 110 inches of water column back pressure is created. These bubbler tanks can contain different liquid components as needed to remove any contaminants in the remaining vapors. The first tank is designed to hold water and is equipped with a level indicator and a PH meter to monitor the condition of the water. Water is used to remove sulfur and the buildup of sulfur will be indicated by a change in the PH. The second bubbler contains caustic soda which will capture any chlorine gas in the vapors. This is also monitored with a PH meter and this second bubbler is also equipped with a level indicator and level sensor.

The last tank on the cyclone cooling system is a standard expansion tank 142 that is designed to catch any liquid droplets that may travel through the piping. Pressure sensors and indicators mounted on this expansion tank keep track of the reactor pressure. Throughout the cyclonic condensing and cooling system 100 are differential pressure gauges. These gauges are used to identify any buildup or clog edge in the pipe or in any component of cyclonic condensing and cooling system 100. The entire process is mounted on a bolted steel frame system. The frame system may utilize a standard A36 carbon steel frame, painted and equipped with matching connection clips for all corresponding equipment. The size and shape of the equipment is designed for quick breakdown and transport in a standard sea container.

Accordingly, the disclosed cyclonic condensing and cooling system 100 improves on heat exchanged technology as it does not require the bolting of the heat exchangers from end to end; takes up much less space than if the current technology was used; increases the surface area inside of the condensers that make up a heat exchanger; requires much lower velocity of the vapor when entering the condenser; allows for the continued release of the condensed liquid after the heat exchange and reaction, allowing the non-condensed vapors to move to the next condenser, and; prevents the build-up of char that could plug the tubes within the condensers.

It should be noted and understood that while the above and other advantages and results of the present invention will become apparent to those skilled in the art from the following detailed description and accompanying drawings, showing the contemplated novel construction, combinations, and elements herein described, and more particularly defined by the appended claims, it should be clearly understood that changes in the precise embodiments of the herein described invention are meant to be included within the scope of the claims, except insofar as they may be precluded by the prior art.

For example, while a select number of cyclonic coolers are described throughout the application, it is readily appreciated that more or less of the disclosed apparatus may be employed by the disclosed subject matter, for example, to accommodate alternate systems, parameters and results. This includes disclosed temperature ranges, velocities, fuels, pressures and volumes.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for processing reusable fuel comprising:
   a first-type cyclone cooler having a first configuration;
   one or more second-type cyclone coolers, wherein each one or more second-type cyclone coolers has a substantially identical second configuration to respective other one or more second-type cyclone coolers, wherein the second configuration is different than the first configuration;
   an air cooled heat exchanger;
   a coil condenser; and
   one or more bubblers,
   wherein the first-type cyclone cooler and the one or more second-type cyclone coolers are connected,
   wherein one of the one or more second-type cyclone coolers is connected to the air cooled heat exchanger,
   wherein the air cooled heat exchanger is connected to the coil condenser,
   wherein the coil condenser is connected to the one or more bubblers.

2. The apparatus of claim 1, wherein the first-type cyclone cooler is connected in a daisy chain configuration with the one or more second-type cyclone coolers.

3. The apparatus of claim 1, wherein the one or more second-type cyclone coolers comprise a first set of turning fins.

4. The apparatus of claim 3, wherein the one or more second-type cyclone coolers comprise a second set of turning fins.

5. The apparatus of claim 4, wherein the first set of turning fins is arranged in a first direction and the second set of turning fins is arranged in a second direction from the first direction.

6. The apparatus of claim 5, wherein the second direction is a reverse direction of the first direction.

7. The apparatus of claim 1, wherein the first-type cyclone cooler and one or more second-type cyclone coolers are arranged as cascading cyclones.

8. The apparatus of claim 7, wherein the one or more second-type cyclone coolers comprises three second-type cyclone coolers.

9. The apparatus of claim 1, wherein the one or more second-type cyclone coolers comprises three second-type cyclone coolers.

10. The apparatus of claim 9, wherein the first-type cyclone cooler and the three second-type cyclone coolers are arranged in series beginning with the first-type cyclone cooler.

11. The apparatus of claim 10, wherein the last second-type cyclone cooler is connected to the air cooled heat exchanger.

12. The apparatus of claim 11, wherein the first-type cyclone cooler and two of the second-type cyclone coolers are connected to a first holding tank.

13. The apparatus of claim 10, wherein the air cooled heat exchanger is connected to the coil condenser.

14. The apparatus of claim 13, the coil condenser is connected to a second holding tank.

15. The apparatus of claim 1, wherein the one or more bubblers comprise a plurality of bubblers that are that are connected in sequence.

16. The apparatus of claim 15, wherein the plurality of bubblers are connected together.

17. The apparatus of claim 16, further comprising:
an expansion tank, wherein the expansion tank is connected to one of the bubblers.

18. An apparatus for processing reusable fuel comprising:
a first-type cyclone cooler having a first configuration;
one or more second-type cyclone coolers, wherein each one or more second-type cyclone coolers has an identical second configuration, wherein the second configuration is different than the first configuration;
an air cooled heat exchanger;
a coil condenser; and
one or more bubblers,
wherein the one or more second-type cyclone coolers comprise a first set of turning fins arranged in a first direction,
wherein the one or more second-type cyclone coolers comprise a second set of turning fins arranged in a second direction from the first direction,
wherein the first-type cyclone cooler and the one or more second-type cyclone coolers are connected,
wherein one of the one or more second-type cyclone coolers is connected to the air cooled heat exchanger,
wherein the air cooled heat exchanger is connected to the coil condenser, and
wherein the coil condenser is connected to the one or more bubblers.

19. The apparatus of claim 18, wherein the second direction is in an opposite direction to the first direction.

20. The apparatus of claim 18, wherein the first direction is a cyclonic rotation direction and the second direction is a cyclonic rotational direction.

* * * * *